United States Patent
Inoue et al.

(10) Patent No.: US 7,276,274 B2
(45) Date of Patent: *Oct. 2, 2007

(54) OPTICAL RECORDING MEDIUM AND METHOD FOR RECORDING AND REPRODUCING DATA

(75) Inventors: Hiroyasu Inoue, Tokyo (JP); Hironori Kakiuchi, Tokyo (JP); Masaki Aoshima, Tokyo (JP); Koji Mishima, Tokyo (JP)

(73) Assignee: TDK Corporation, Tokyo (JP)

( * ) Notice: Subject to any disclaimer, the term of this patent is extended or adjusted under 35 U.S.C. 154(b) by 550 days.

This patent is subject to a terminal disclaimer.

(21) Appl. No.: 10/613,525

(22) Filed: Jul. 3, 2003

(65) Prior Publication Data

US 2004/0052194 A1 Mar. 18, 2004

(30) Foreign Application Priority Data

Jul. 4, 2002 (JP) ............................. 2002-196335

(51) Int. Cl.
*B32B 3/02* (2006.01)

(52) U.S. Cl. .................. 428/64.4; 369/284; 430/270.4; 720/718

(58) Field of Classification Search ............... 428/64.4; 430/270.12
See application file for complete search history.

(56) References Cited

U.S. PATENT DOCUMENTS

| | | | |
|---|---|---|---|
| 3,959,799 A | 5/1976 | Gambino et al. ........... | 346/135 |
| 4,357,616 A | 11/1982 | Terao et al. .............. | 346/135.1 |
| 4,405,706 A | 9/1983 | Takahashi et al. .......... | 430/271 |

(Continued)

FOREIGN PATENT DOCUMENTS

CN 1330368 A 1/2002

(Continued)

OTHER PUBLICATIONS

Narumi, K. et al., "45GB Rewritable Dual-Layer Phase-Change Optical Disk With A Transmittance Balanced Structure", Technical Digest, International Symposium on Optical Memory 2001, Grand Hotel, Taipei, Taiwan, Oct. 16-19, 2001, pp. 202 & 203.

(Continued)

*Primary Examiner*—Bruce H. Hess
(74) *Attorney, Agent, or Firm*—Seed IP Law Group PLLC

(57) ABSTRACT

An optical recording medium includes a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, at least one recording layer other than a farthest recording layer from the light transmission layer among the plurality of recording layers including a first recording film containing Si as a primary component and a second recording film located in the vicinity of the first recording film and containing Cu as a primary component. In the thus constituted optical recording medium, it is possible to record data in a farthest recording layer from the light transmission layer and reproduce data from the farthest recording layer in a desired manner.

27 Claims, 7 Drawing Sheets

U.S. PATENT DOCUMENTS

| | | | | |
|---|---|---|---|---|
| 4,477,819 A | 10/1984 | Lee et al. | ............ | 346/76 L |
| 4,500,889 A | 2/1985 | Wada et al. | ............ | 346/1.1 |
| 4,529,991 A | 7/1985 | Wada et al. | ............ | 346/76 L |
| 4,587,533 A | 5/1986 | Nakane | ............ | 346/135.1 |
| 4,609,611 A | 9/1986 | Sigyo et al. | ............ | 430/270 |
| 4,647,947 A | 3/1987 | Takeoka | ............ | 346/135.1 |
| 4,670,345 A | 6/1987 | Morimoto | ............ | 428/411.1 |
| 4,682,321 A | 7/1987 | Takaoka et al. | ............ | 369/284 |
| 4,771,413 A | 9/1988 | Nago | ............ | 369/109 |
| 4,772,897 A | 9/1988 | Ohkawa | ............ | 346/135.1 |
| 5,194,363 A | 3/1993 | Yoshioka et al. | ............ | 430/271 |
| 5,208,088 A | 5/1993 | Tominaga et al. | ............ | 428/64 |
| 5,297,132 A | 3/1994 | Takano et al. | ............ | 369/284 |
| 5,325,351 A | 6/1994 | Uchiyama et al. | ............ | 369/275.1 |
| 5,328,813 A | 7/1994 | Strandjord et al. | ............ | 430/321 |
| 5,401,330 A | 3/1995 | Saito et al. | ............ | 136/259 |
| 5,414,451 A | 5/1995 | Sugiyama et al. | ............ | 347/258 |
| 5,458,941 A | 10/1995 | Hintz | ............ | 428/64.4 |
| 5,459,018 A | 10/1995 | Akahira | ............ | 430/270 |
| 5,560,998 A | 10/1996 | Oyamatsu et al. | ............ | 428/694 ML |
| 5,656,370 A | 8/1997 | Murakami et al. | ............ | 428/332 |
| 5,818,808 A | 10/1998 | Takada et al. | ............ | 369/116 |
| 5,871,881 A | 2/1999 | Nishida et al. | ............ | 430/270.11 |
| 5,912,104 A | 6/1999 | Hirotsune et al. | ............ | 430/270.13 |
| 5,948,496 A | 9/1999 | Kinoshita et al. | ............ | 428/64.1 |
| 5,949,747 A | 9/1999 | Miyashita et al. | ............ | 369/54 |
| 5,958,649 A | 9/1999 | Hirotsune et al. | ............ | 430/270.13 |
| 6,033,752 A * | 3/2000 | Suzuki et al. | ............ | 428/64.1 |
| 6,096,399 A | 8/2000 | Yoshinari et al. | ............ | 428/64.1 |
| 6,111,851 A | 8/2000 | Ohki et al. | ............ | 369/286 |
| 6,143,469 A | 11/2000 | Ohta et al. | ............ | 430/270.13 |
| 6,210,860 B1 | 4/2001 | Fukano et al. | ............ | 430/270.12 |
| 6,231,945 B1 | 5/2001 | Miyamoto et al. | ............ | 429/64.1 |
| 6,245,404 B1 | 6/2001 | Saito et al. | ............ | 428/64.1 |
| 6,254,966 B1 | 7/2001 | Kondo | ............ | 428/156 |
| 6,266,299 B1 | 7/2001 | Oshima et al. | ............ | 369/13 |
| 6,278,680 B1 | 8/2001 | Miyauchi et al. | ............ | 369/112.01 |
| 6,333,913 B1 | 12/2001 | Yoshinari et al. | ............ | 369/283 |
| 6,355,326 B1 | 3/2002 | Lee et al. | ............ | 428/64.1 |
| 6,404,712 B1 | 6/2002 | Lee et al. | ............ | 369/47.53 |
| 6,404,713 B1 | 6/2002 | Ueki | ............ | 369/47.53 |
| 6,416,837 B1 | 7/2002 | Kojima et al. | ............ | 428/64.1 |
| 6,449,239 B1 | 9/2002 | Uno et al. | ............ | 369/275.1 |
| 6,528,138 B2 | 3/2003 | Meinders et al. | ............ | 428/64.1 |
| 6,551,679 B1 | 4/2003 | Kuroda et al. | ............ | 428/64.1 |
| 6,608,799 B2 | 8/2003 | Hozumi | ............ | 369/13.26 |
| 6,611,481 B1 | 8/2003 | Koishi et al. | ............ | 369/47.53 |
| 6,636,477 B1 | 10/2003 | Miyamoto et al. | ............ | 369/286 |
| 6,656,559 B2 | 12/2003 | Mizushima et al. | ............ | 428/64.1 |
| 6,660,451 B1 | 12/2003 | Sakaue et al. | ............ | 430/270.13 |
| 6,670,014 B2 | 12/2003 | Nishihara et al. | ............ | 428/64.1 |
| 6,751,184 B2 | 6/2004 | Kojima et al. | ............ | 369/275.2 |
| 6,788,635 B1 | 9/2004 | Aratani et al. | ............ | 369/100 |
| 6,791,926 B1 | 9/2004 | Furumiya et al. | ............ | 369/53.13 |
| 6,805,935 B2 | 10/2004 | Ashida et al. | ............ | 428/64.1 |
| 6,807,142 B1 | 10/2004 | Nagata et al. | ............ | 369/275.2 |
| 6,841,218 B2 | 1/2005 | Hosoda et al. | ............ | 428/64.1 |
| 6,929,840 B2 | 8/2005 | Hosoda et al. | ............ | 428/64.1 |
| 6,982,111 B2 * | 1/2006 | Mizushima et al. | ............ | 428/64.1 |
| 6,996,055 B2 * | 2/2006 | Mishima et al. | ............ | 369/283 |
| 7,002,887 B2 * | 2/2006 | Kakiuchi et al. | ............ | 369/59.12 |
| 7,018,694 B2 | 3/2006 | Hosoda et al. | ............ | 428/64.1 |
| 7,167,431 B2 | 1/2007 | Miura et al. | ............ | 369/59.11 |
| 2001/0012257 A1 | 8/2001 | Suzuki et al. | ............ | 369/94 |
| 2001/0017833 A1 | 8/2001 | Yamada et al. | ............ | 369/59.11 |
| 2001/0021160 A1 | 9/2001 | Shuy et al. | ............ | 369/100 |
| 2001/0041304 A1 | 11/2001 | Uno et al. | ............ | 430/270.13 |
| 2001/0044002 A1 | 11/2001 | Shingai et al. | ............ | 428/64.4 |
| 2001/0044073 A1 | 11/2001 | Fukano et al. | ............ | 430/270.12 |
| 2002/0060979 A1 | 5/2002 | Tsukuda et al. | ............ | 369/275.4 |
| 2002/0076646 A1 | 6/2002 | Zhou et al. | ............ | 430/270.13 |
| 2002/0110063 A1 | 8/2002 | Yamada et al. | ............ | 369/47.39 |
| 2002/0160306 A1 | 10/2002 | Hanaoka et al. | ............ | 430/270.13 |
| 2002/0168587 A1 | 11/2002 | Sakaue et al. | ............ | 430/270.13 |
| 2003/0086359 A1 | 5/2003 | Lee et al. | ............ | 369/275.3 |
| 2003/0134229 A1 | 7/2003 | Yasuda et al. | ............ | 430/270.13 |
| 2003/0165111 A1 | 9/2003 | Flynn | ............ | 369/288 |
| 2003/0190551 A1 * | 10/2003 | Aoshima et al. | ............ | 430/270.12 |
| 2003/0202452 A1 * | 10/2003 | Mishima et al. | ............ | 369/112.23 |
| 2003/0223351 A1 * | 12/2003 | Aoshima et al. | ............ | 369/288 |
| 2003/0224215 A1 | 12/2003 | Kondo et al. | ............ | 428/694 |
| 2003/0228539 A1 | 12/2003 | Hosoda et al. | ............ | 430/270.13 |
| 2003/0231577 A1 * | 12/2003 | Mishima et al. | ............ | 369/283 |
| 2004/0001418 A1 | 1/2004 | Shinotsuka et al. | ............ | 369/111 |
| 2004/0004932 A1 * | 1/2004 | Inoue et al. | ............ | 369/283 |
| 2004/0013069 A1 | 1/2004 | Uno et al. | ............ | 369/59.11 |
| 2004/0018334 A1 | 1/2004 | Nee | ............ | 428/64.1 |
| 2004/0027652 A1 | 2/2004 | Erdogan et al. | ............ | 359/359 |
| 2004/0027973 A1 | 2/2004 | Aoshima et al. | ............ | 369/121 |
| 2004/0038080 A1 | 2/2004 | Inoue et al. | ............ | 428/694 SC |
| 2004/0052176 A1 | 3/2004 | Narumi et al. | ............ | 369/47.39 |
| 2004/0052194 A1 | 3/2004 | Inoue et al. | ............ | 369/112.23 |
| 2004/0076907 A1 | 4/2004 | Inoue et al. | ............ | 430/270.12 |
| 2004/0110086 A1 | 6/2004 | Kakiuchi et al. | ............ | 430/270.12 |
| 2004/0139459 A1 | 7/2004 | Mishima et al. | ............ | 720/718 |
| 2004/0152016 A1 | 8/2004 | Mishima et al. | ............ | 430/270.12 |
| 2004/0157158 A1 | 8/2004 | Kakiuchi et al. | ............ | 430/270.12 |
| 2004/0174796 A1 | 9/2004 | Mizushima et al. | ............ | 369/94 |
| 2004/0174804 A1 | 9/2004 | Kakiuchi et al. | ............ | 369/275.4 |
| 2004/0190435 A1 | 9/2004 | Hosoda et al. | ............ | 369/283 |
| 2004/0191685 A1 | 9/2004 | Kakiuchi et al. | ............ | 430/270.11 |
| 2004/0241581 A1 | 12/2004 | Kakiuchi et al. | ............ | 430/270.12 |
| 2005/0018590 A1 | 1/2005 | Inoue et al. | ............ | 369/275.2 |
| 2005/0018591 A1 | 1/2005 | Inoue et al. | ............ | 369/275.2 |
| 2005/0018592 A1 | 1/2005 | Inoue et al. | ............ | 369/275.2 |
| 2005/0047301 A1 | 3/2005 | Inoue et al. | ............ | 369/94 |
| 2005/0047302 A1 | 3/2005 | Inoue et al. | ............ | 369/94 |
| 2005/0047303 A1 | 3/2005 | Inoue et al. | ............ | 369/94 |
| 2005/0047304 A1 | 3/2005 | Inoue et al. | ............ | 369/94 |
| 2005/0047305 A1 | 3/2005 | Inoue et al. | ............ | 369/94 |
| 2005/0047306 A1 | 3/2005 | Inoue et al. | ............ | 369/94 |
| 2005/0048249 A1 | 3/2005 | Inoue et al. | ............ | 428/64.4 |
| 2005/0052194 A1 | 3/2005 | Kister et al. | ............ | 324/755 |
| 2005/0074306 A1 | 4/2005 | Montresor | ............ | 409/179 |
| 2005/0094526 A1 | 5/2005 | Kakiuchi et al. | ............ | 369/59.11 |
| 2005/0243676 A1 | 11/2005 | Kato et al. | ............ | 369/59.11 |
| 2006/0013111 A1 | 1/2006 | Inoue et al. | ............ | 369/125 |

FOREIGN PATENT DOCUMENTS

| | | |
|---|---|---|
| CN | 1365108 A | 8/2002 |
| EP | 0 068 801 B1 | 9/1986 |
| EP | 0 474 311 A1 | 3/1992 |
| EP | 0 350 078 B1 | 3/1994 |
| EP | 0 822 543 A1 | 2/1998 |
| EP | 0 978 831 A2 | 2/2000 |
| EP | 1 028 421 A2 | 8/2000 |
| EP | 1 122 723 | 8/2001 |
| EP | 1 154 413 A2 | 11/2001 |
| EP | 1 172 811 A2 | 1/2002 |
| EP | 1 178 472 A2 | 2/2002 |
| EP | 1 215 669 A2 | 6/2002 |
| EP | 0 947 351 B1 | 9/2002 |
| EP | 1 351 230 A2 | 10/2003 |
| EP | 1 139 340 B1 | 6/2004 |
| GB | 2 336 463 | 10/1999 |
| JP | 48-38 | 1/1973 |
| JP | 54133134 | 10/1979 |
| JP | 56124134 | 9/1981 |
| JP | 57-022095 | 2/1982 |
| JP | 57-027788 | 2/1982 |
| JP | 58-220794 | 12/1983 |
| JP | 59-225992 | 12/1984 |
| JP | 60-160036 | 8/1985 |

| | | |
|---|---|---|
| JP | 60219097 | 11/1985 |
| JP | 62-28941 | 2/1987 |
| JP | 62-204442 | 9/1987 |
| JP | 62-245545 | 10/1987 |
| JP | 62226442 | 10/1987 |
| JP | 362226440 | 10/1987 |
| JP | 01-158633 | 6/1989 |
| JP | 1-270528 | 10/1989 |
| JP | 2-152029 | 6/1990 |
| JP | 3-5929 | 1/1991 |
| JP | 3-49054 | 3/1991 |
| JP | 3-258590 | 11/1991 |
| JP | 4-86283 | 3/1992 |
| JP | 4-226785 | 8/1992 |
| JP | 4-298389 | 10/1992 |
| JP | 5-159358 | 6/1993 |
| JP | 5-342631 | 12/1993 |
| JP | 5-342635 | 12/1993 |
| JP | 6-171236 | 6/1994 |
| JP | 6-262854 | 9/1994 |
| JP | 7-235465 | 9/1995 |
| JP | 9-7176 | 1/1997 |
| JP | 10-76755 | 3/1998 |
| JP | 410143919 | 5/1998 |
| JP | 2000-187884 | 7/2000 |
| JP | 2000-222764 | 8/2000 |
| JP | 2000-285509 | 10/2000 |
| JP | 2000-297365 | 10/2000 |
| JP | 2001101709 | 4/2001 |
| JP | 2001-222819 | 8/2001 |
| JP | 2001-243655 | 9/2001 |
| JP | 2001266402 | 9/2001 |
| JP | 2001-322357 | 11/2001 |
| JP | 2002-104317 | 4/2002 |
| JP | 2002-120458 | 4/2002 |
| JP | 2002-269808 | 9/2002 |
| JP | 2002-329348 | 11/2002 |
| JP | 2003-54135 | 2/2003 |
| JP | 2003-85778 | 3/2003 |
| JP | 2003105738 | 4/2003 |
| JP | 2003-178448 | 6/2003 |
| JP | 2003-260874 | 9/2003 |
| JP | 2003-326848 | 11/2003 |
| JP | 2004-39177 | 2/2004 |
| JP | 2004-87073 | 3/2004 |
| JP | 2004-158134 | 6/2004 |
| WO | WO 01/93256 A1 | 12/2001 |
| WO | WO 02/29787 A1 | 4/2002 |
| WO | 03025924 | 3/2003 |

OTHER PUBLICATIONS

Nikkei Electronics, May 12, 2003, pp. 119-133.

Kato, T., et al. "The phase change optical disc with the data recording rate of 140 Mbps", p. 200 and 201.

Inoue, H., et al., "Inorganic Write-Once Disc for High Speed Recording," Jpn. J. Appl. Phys. vol. 42, part 1, No. 2B, pp. 1056-1061, Feb. 2003.

Yoshii, K., et al., "Investigation of Hole Formation on Cr/Al, Si/Al, and C/Al Bilayer Films by Laser Bean Irradiation," *Journal of Applied Physics* 55(1):223-229, Jan. 1, 1984.

* cited by examiner

OPTICAL RECORDING MEDIUM AND METHOD FOR RECORDING AND REPRODUCING DATA

BACKGROUND OF THE INVENTION

The present invention relates to an optical recording medium and a method for recording and reproducing data and, particularly, to an optical recording medium which is constituted so that data can be recorded in a plurality of recording layers and data can be reproduced from the plurality of recording layers by projecting a laser beam thereonto via a light transmission layer and in which data can be recorded in a farthest recording layer from the light transmission layer in a desired manner and data can be reproduced from the farthest recording layer in a desired manner, and a method for recording data in and reproducing data from such an optical recording medium in a desired manner.

DESCRIPTION OF THE PRIOR ART

Optical recording media such as the CD, DVD and the like have been widely used as recording media for recording digital data. Such optical recording media require improvement in ability to record large amounts of data and various proposals have been made in order to increase the data recording capacity thereof.

One of these is an optical recording medium having two recording layers and such an optical recording medium has been already put to the practical use as an optical recording medium adapted to enable only data reading, such as the DVD-Video and the DVD-ROM.

An optical recording medium adapted only for reading data and provided with two recording layers is formed by laminating two substrates each having prepits constituting a recording layer on the surface thereof via an intermediate layer.

Further, an optical recording medium having two recording layers has been recently proposed in connection with optical recording media in which data can be rewritten by the user (See Japanese Patent Application Laid Open No. 2001-243655 etc.).

A rewritable type optical recording medium having two recording layers is constituted by laminating recording layers each including a recording film sandwiched between dielectric layers (protective layers) via an intermediate layer.

In the case where data are to be recorded in a rewritable type optical recording medium having two recording layers, the phase state of one of the recording layers is changed by adjusting the focus of a laser beam onto the one of the recording layers, setting the power of the laser beam to a recording power Pw whose level is sufficiently higher than a reproducing power Pr and projecting the laser beam onto the recording layer to form a record mark at a predetermined region of the recording layer.

Since the reflection coefficient of the thus formed record mark is different from those of blank regions in which no record mark is formed, it is possible to reproduce data recorded in one of the recording layers by adjusting the focus of the laser beam onto the recording layer, projecting the laser beam whose power is set to the reproducing power Pr and detecting the amount of light reflected by the recording layer.

In this manner, in the rewritable type optical recording medium having two recording layers, since data are recorded in one of the recording layers and data recorded in the recording layer are reproduced by adjusting the focus of the laser beam onto the recording layer and projecting the laser beam onto the recording layer, when data are to be recorded in the farther recording layer (hereinafter referred to as the "L1 layer") from the light incident plane and data are produced therefrom, the laser beam is projected via the closer recording layer (hereinafter referred to as the "L0 layer") to the light incident plane onto the L1 layer.

Therefore, in the case of recording data in the L1 layer and reproducing data from the L1 layer, the amount of a laser beam projected onto the L1 layer and the amount of the laser beam reflected by the L1 layer and detected are influenced by the L0 layer. Accordingly, in the case where the light transmittance of a region of the L0 layer where a record mark is formed and that of a blank region of the L0 layer where no record mark is formed are greatly different from each other, when data are recorded in the L1 layer and data recorded in the L1 layer are reproduced by adjusting the focus of a laser beam on the L1 layer and irradiating the L1 layer with the laser beam, the amount of the laser beam projected onto the L1 layer and the amount of the laser beam reflected by the L1 layer and detected differ greatly depending upon whether the region of the L0 layer through which the laser beam is projected is a region where a record mark is formed or a blank region. As a result, the recording characteristics of the L1 layer and the amplitude of a signal reproduced from the L1 layer change greatly depending upon whether the region of the L0 layer through which the laser beam is projected is a region where a record mark is formed or a blank region.

In particular, when data recorded in the L1 layer are reproduced, if the region of the L0 layer through which the laser beam is transmitted includes the boundary between a region where a record mark is formed and a blank region, since the distribution of the reflection coefficient is not uniform at the spot of the laser beam, data recorded in the L1 layer cannot be reproduced in a desired manner.

The same problems also occur in a write-once type optical recording medium having two or more recording layers and an optical recording medium having an L1 layer for reading data only and it has been desired to solve there problems.

SUMMARY OF THE INVENTION

It is therefore an object of the present invention to provide an optical recording medium which is constituted so that data can be recorded in a plurality of recording layers and data can be reproduced from the plurality of recording layers by projecting a laser beam thereonto via a light transmission layer and in which data can be recorded in a farthest recording layer from the light transmission layer in a desired manner and data can be reproduced from the farthest recording layer in a desired manner, and a method for recording data in and reproducing data from such an optical recording medium in a desired manner.

The inventors of the present invention vigorously pursued a study for accomplishing the above objects and, as a result, made the discovery that in the case where at least one recording layer other than the farthest recording layer from a light transmission layer among the plurality of recording layers was formed so as to include a first recording film containing an element selected from the group consisting of Si, Ge, Sn, Mg, In, Zn, Bi and Al as a primary component and a second recording film containing an element selected from a group consisting of Cu, Al, Zn, Ti and Ag as a primary component, when data were recorded in the at least one recording layer, the element contained in the first recording film as a primary component and the element contained in the second recording film as a primary component were mixed with each other by a laser beam, thereby forming a record mark whose reflection coefficient was different from those of other regions of the first recording film and the second recording film and data could be recorded in the at least one recording layer with high sensitivity. The inventors of the present invention made the further discovery that the difference in light transmittances for a laser beam having a wavelength of 350 nm to 450 nm between a region where a record mark was formed and a blank region was equal to or lower than 4% and in the case of recording data in the farthest recording layer from a light transmission layer or reproducing data from the farthest recording layer from a light transmission layer by irradiating it with a laser beam having a wavelength of 350 nm to 450 nm via the at least one recording layer, even if a region of the recording layer through which the laser beam is transmitted contained a boundary between a region where a record mark is formed and a blank region, it was possible to record data in the farthest recording layer from a light transmission layer and reproduce data from the farthest recording layer from the light transmission layer in a desired manner.

Therefore, the above and other objects of the present invention can be accomplished by an optical recording medium comprising a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, at least one recording layer other than a farthest recording layer from the light transmission layer among the plurality of recording layers including a first recording film containing an element selected from the group consisting of Si, Ge, Sn, Mg, In, Zn, Bi and Al as a primary component and a second recording film located in the vicinity of the first recording film and containing an element selected from a group consisting of Cu, Al, Zn, Ti and Ag as a primary component.

In the present invention, the statement that the first recording film contains a certain element as a primary component means that the content of the element is maximum among the elements contained in the first recording film, while the statement that the second recording film contains a certain element as a primary component means that the content of the element is maximum among the elements contained in the second recording film.

In the present invention, it is not absolutely necessary for the second recording film to be in contact with the first recording film and it is sufficient for the second recording film to be so located in the vicinity of the first recording film as to enable formation of a mixed region including the primary component element of the first recording film and the primary component element of the second recording film when the region is irradiated with a laser beam. Further, one or more other films such as a dielectric film may be interposed between the first recording film and the second recording film.

In the present invention, it is preferable to form the second recording film to be in contact with the first recording film.

In the present invention, the farthest layer from the light transmission layer may include one or more recording films containing an element selected from the group consisting of Si, Ge, Sn, Mg, In, Zn, Bi and Al as a primary component or one or more recording films containing an element selected from a group consisting of Cu, Al, Zn, Ti and Ag as a primary component in addition to the first recording film and the second recording film.

Although the reason why a record mark region including the mixture of the primary component element of the first recording film and the primary component element of the second recording film can be formed when irradiated with a laser beam is not altogether clear, it is reasonable to conclude that the primary component elements of the first and second recording film are partially or totally fused or diffused, thereby forming a region where the primary component elements of the first and second recording films mix.

In this manner, the reflection coefficient of a region formed by mixing the element contained in the first recording film as a primary component and the element contained in second recording film as a primary component with respect to a laser beam for reproducing data is greatly different from those of other regions in the first recording film and the second recording film. It is therefore possible to reproduce recorded data utilizing such large difference in the reflection coefficients, thereby obtaining a reproduced signal having an improved C/N ratio.

Further, the inventors found that these elements apply only light load to the environment and that the recording layers including these elements have excellent surface smoothness.

In the present invention, it is preferable for the first recording film to contain Si as a primary component.

In the present invention, it is preferable for the second recording film to contain Cu as a primary component.

The initial recording characteristic can be particularly improved in comparison with conventional optical recording media when the second recording film containing Cu as a primary component is formed by a vacuum deposition process or a sputtering process because the surface smoothness thereof becomes very good. Since the recording films of the optical recording medium according to the present invention therefore have excellent surface smoothness, it is possible to markedly improve the recording characteristic when data are recorded by a laser beam having a reduced spot diameter. Moreover, since Cu is quite inexpensive, the cost of the materials used to fabricate the optical recording medium can be minimized.

In the present invention, it is preferable to add at least one element selected from the group consisting of Al, Zn, Sn, Mg and Au and different from the element contained in the second recording layer as a primary component to the second recording film.

In the case where at least one element selected from the group consisting of Al, Zn, Sn and Au and different from the element contained in the second recording layer as a primary component is added to the second recording film in this manner, it is possible to markedly improve the stability of the second recording film against oxidation or sulfurization and to effectively prevent degradation of the appearance of the optical recording medium, such as by peeling of the second recording film and the like owing to corrosion of Cu or the like contained in the second recording film as a primary component, and change in the reflection coefficient of the optical recording medium during long storage.

The above and other objects of the present invention can be also accomplished by an optical recording medium comprising a substrate, a light transmission layer and a plurality of recording layers between the substrate and the light transmission layer and capable of forming record marks in the plurality of recording layers, thereby recording data therein and reproducing data recorded in the plurality of recording layers by projecting a laser beam via the light transmission layer onto the plurality of recording layers, at least one recording layer other than a farthest recording layer from the light transmission layer among the plurality of recording layers being constituted so that difference in light transmittances between a region of a record mark formed by the irradiation of the laser beam and blank regions is equal to or lower than 4%.

In the present invention, it is preferable for the at least one recording layer other than a farthest recording layer from the light transmission layer among the plurality of recording layers to include a reflective film containing Ag as a primary component and added with C as an additive.

It is necessary to form the reflective film of a material having a high light transmittance and a high thermal conductivity in order to simultaneously improve the recording characteristic and the reproducing characteristic of the at least one recording layer other than a farthest recording layer from the light transmission layer (hereinafter referred to as an "L0 layer") and those of the farthest recording layer from the light transmission layer, and Ag is a typical material having such characteristics. However, Ag corrodes easily. Therefore, when the reflective film included in the L0 layer is formed of Ag, the storage reliability of the optical recording medium is low. However, in the case where the L0 layer includes a reflective film containing Ag as a primary component and C as an additive, it is possible to improve the light transmittance and the thermal conductivity of the reflective film included in the L0 layer while preventing the reflective film from being corroded and it is therefore possible to improve recording characteristics and reproducing characteristic of the respective recording layers and improve the storage reliability of the optical recording medium.

In particular, since energy per unit area of the spot of a laser beam is high in a next-generation type optical recording medium in which the thickness of the light transmission layer is set at 30 μm to 200 μm and data are recorded therein and reproduced therefrom by condensing a laser beam having a wavelength equal to or shorter than 450 nm using an objective lens having a numerical aperture equal to or larger than 0.7 in order to record data with high density, it is required for the next-generation type optical recording medium to have a high heat radiation characteristic and, therefore, it is particularly effective in the next-generation type optical recording medium to provide a reflective film containing Ag as a primary component and added with C as an additive.

Further, in the case where the reflective film contains Ag as a primary component and inexpensive C as an additive, it is possible to prevent material cost of the optical recording medium from increasing.

In the present invention, it is preferable that the reflective film included in the at least one recording layer other than the farthest recording layer from the light transmission layer contains 0.5 atomic % to 5.0 atomic % of C. When the amount of C added to the reflective film exceeds 5.0 atomic %, it is difficult to form a reflective film having sufficiently high light transmittance and thermal conductivity and, on the other hand, when the amount of C added to the reflective film is less than 0.5 atomic %, the storage reliability of the optical recording medium becomes low.

In the present invention, it is more preferable that the reflective film contains 1.0 atomic % to 4.0 atomic % of C and it is particularly preferable that the reflective film contains about 2.5 atomic % of C. When the amount of C added to the reflective film is equal to or less than 4.0 atomic %, it is possible to form a reflective film having light transmittance close to that of a reflective film formed of pure Ag and on the other hand, when the amount of C added to the reflective film exceeds 2.0 atomic %, improvement in the storage reliability of the optical recording medium is small even if the amount of C is increased. When the reflective film contains about 2.5 atomic % of C, it is possible to form a reflective film having substantially the same light transmittance as that of a reflective film formed of pure Ag and obtain the optical recording medium having high storage reliability.

In the present invention, it is preferable that the light transmission layer has a thickness of 30 μm to 200 μm.

In the present invention, the optical recording medium is preferably constituted so that data are recorded therein and data are reproduced therefrom by projecting a laser beam having a wavelength of 350 nm to 450 nm thereonto.

In the present invention, the optical recording medium is preferably constituted so that data are recorded therein and data are reproduced therefrom by employing an objective lens and a laser beam whose numerical aperture NA and wavelength λ satisfy λ/NA≦640 nm, and projecting the laser beam thereonto via the objective lens.

The above and other objects of the present invention can be also accomplished by a method for recording and reproducing data comprising the steps of projecting a laser beam onto an optical recording medium comprising a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, at least one recording layer other than a farthest recording layer from the light transmission layer among the plurality of recording layers including a first recording film containing an element selected from the group consisting of Si, Ge, Sn, Mg, In, Zn, Bi and Al as a primary component and a second recording film located in the vicinity of the first recording film and containing an element selected from a group consisting of Cu, Al, Zn, Ti and Ag as a primary component, thereby causing the laser beam to pass through the light transmission layer, and recording data in the plurality of recording layers or reproducing data from the plurality of recording layers.

In a preferred aspect of the present invention, the method for recording and reproducing data comprises a step of irradiating the optical recording medium with a laser beam having a wavelength of 350 nm to 450 nm, thereby recording data in the optical recording medium or reproducing data from the optical recording medium.

In another a preferred aspect of the present invention, the method for recording and reproducing data comprises a step of employing an objective lens and a laser beam whose numerical aperture NA and wavelength λ satisfy λ/NA≦640 nm, and projecting the laser beam onto the optical recording medium via the objective lens, thereby recording data in the optical recording medium or reproducing data from the optical recording medium.

The above and other objects and features of the present invention will become apparent from the following description made with reference to the accompanying drawings.

DESCRIPTION OF THE PREFERRED EMBODIMENTS

Figure 1:
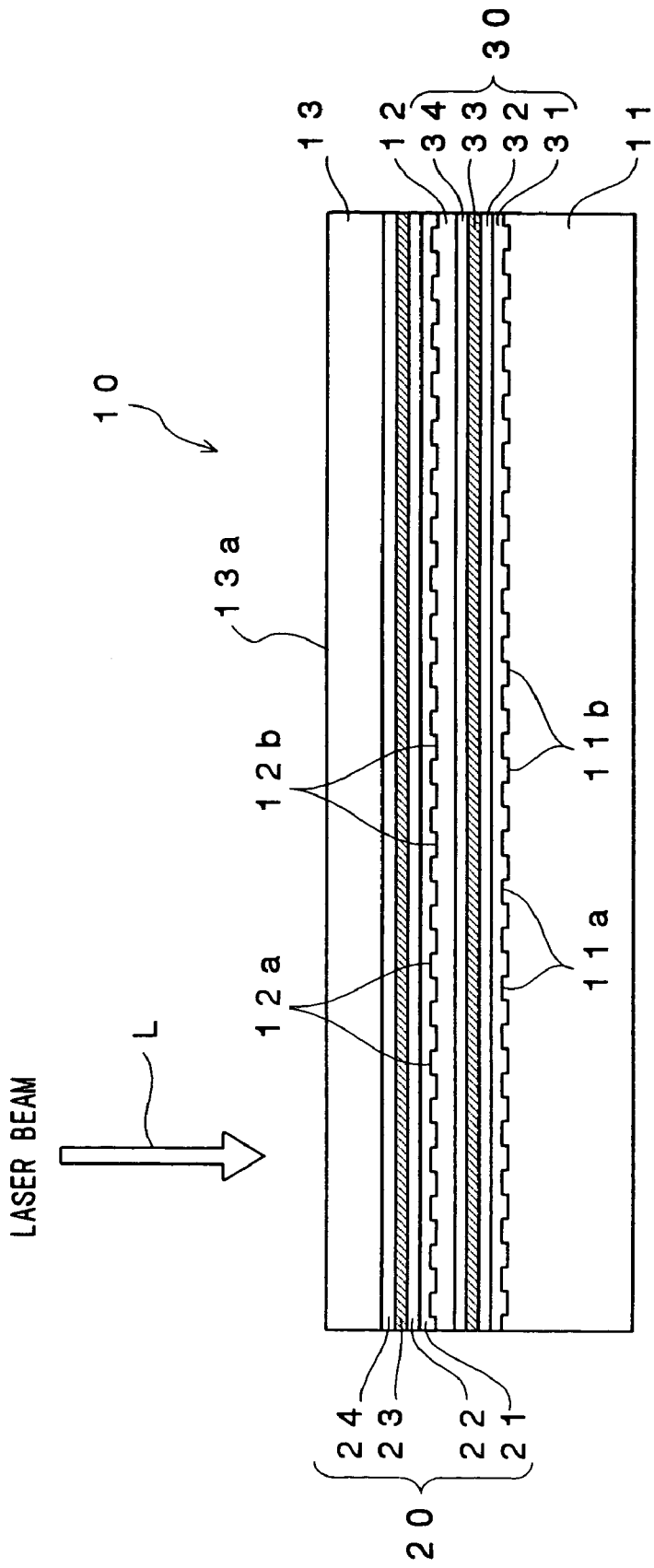
FIG. 1 is a schematic cross-sectional view showing the structure of an optical recording medium that is a preferred embodiment of the present invention.

FIG. 1 is a schematic cross-sectional view showing the structure of an optical recording medium that is a preferred embodiment of the present invention.

As shown in FIG. 1, an optical recording medium 10 according to this embodiment is constituted as a write-once type optical recording medium and includes a disk-like support substrate 11, a transparent intermediate layer 12, a light transmission layer 13, an L0 layer 20 formed between the transparent layer 12 and the light transmission layer 13, and an L1 layer 30 formed between the support substrate 11 and the transparent intermediate layer 12.

The L0 layer 20 and the L1 layer 30 are recording layers in which data are recorded, i.e., the optical recording medium 10 according to this embodiment includes two recording layers.

The L0 layer 20 constitutes a recording layer close to a light incident plane 13a and is constituted by laminating a reflective film 21, a second dielectric film 22, an L0 recording layer 23 and a first dielectric film 24 from the side of the support substrate 11.

On the other hand, the L1 layer 30 constitutes a recording layer far from the light incident plane 13a and is constituted by laminating a reflective film 31, a fourth dielectric film 32, an L1 recording layer 33 and a third dielectric film 34.

In the case where data are to be recorded in the L1 layer 30 and data recorded in the L1 layer 30 are to be reproduced, a laser beam L is projected thereon through the L0 layer 20 located closer to the light transmission layer 13.

Therefore, it is necessary for the L0 layer 20 to have a high light transmittance. Concretely, the L0 layer 20 has a light transmittance equal to or higher than 30% with respect to the laser beam L used for recording data and reproducing data and preferably has a light transmittance equal to or higher than 40%.

In order to record data with high density, it is necessary to reduce the diameter of the laser beam L and, therefore, the laser beam L used for recording data and reproducing data has a wavelength equal to or shorter than 500 nm and preferably a wavelength of 200 to 450 nm.

The support substrate 11 serves as a support for ensuring mechanical strength required for the optical recording medium 10.

The material used to form the support substrate 11 is not particularly limited insofar as the support substrate 11 can serve as the support of the optical recording medium 10. The support substrate 11 can be formed of glass, ceramic, resin or the like. Among these, resin is preferably used for forming the support substrate 11 since resin can be easily shaped. Illustrative examples of resins suitable for forming the support substrate 11 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the support substrate 11 from the viewpoint of easy processing, optical characteristics and the like and in this embodiment, the support substrate 11 is formed of polycarbonate resin. In this embodiment, since the laser beam L is projected via the light incident plane 13a located opposite to the support substrate 11, it is unnecessary for the support substrate 11 to have a light transmittance property.

In this embodiment, the support substrate 11 has a thickness of about 1.1 mm.

As shown in FIG. 1, grooves 11a and lands 11b are alternately formed on the surface of the support substrate 11. The grooves 11a and/or lands 11b serve as a guide track for the laser beam L when data are to be recorded or when data are to be reproduced.

The depth of the groove 11a is not particularly limited and is preferably set to 10 nm to 40 nm. The pitch of the grooves 11a is not particularly limited and is preferably set to 0.2 μm to 0.4 μm.

The transparent intermediate layer 12 serves to space the L0 layer 20 and the L1 layer 30 apart by a physically and optically sufficient distance.

As shown in FIG. 1, grooves 12a and lands 12b are alternately formed on the surface of the transparent intermediate layer 12. The grooves 12a and/or lands 12b formed on the surface of the transparent intermediate layer 12 serve as a guide track for the laser beam L when data are to be recorded or when data are to be reproduced.

The depth of the groove 12a and the pitch of the grooves 12a can be set to be substantially the same as those of the grooves 11a formed on the surface of the support substrate 11.

It is preferable to form the transparent intermediate layer 12 so as to have a thickness of 5 μm to 50 μm and it is more preferable to form it so as to have a thickness of 10 μm to 40 μm.

The material for forming the transparent intermediate layer 12 is not particularly limited and an ultraviolet ray curable acrylic resin is preferably used for forming the transparent intermediate layer 12.

It is necessary for the transparent intermediate layer 12 to have sufficiently high light transmittance since the laser beam L passes through the transparent intermediate layer 12 when data are to be recorded in the L1 layer 30 and data recorded in the L1 layer 30 are to be reproduced.

The light transmission layer 13 serves to transmit the laser beam L and the light incident plane 13a is constituted by one of the surfaces thereof.

It is preferable to form the light transmission layer 13 so as to have a thickness of 30 μm to 200 μm.

The material for forming the light transmission layer 13 is not particularly limited and, similarly to the transparent intermediate layer 12, an ultraviolet ray curable acrylic resin is preferably used for forming the light transmission layer 13.

It is necessary for the light transmission layer 13 to have sufficiently high light transmittance since the laser beam L passes through the transparent intermediate layer 13 when data are to be recorded in the L1 layer 30 and data recorded in the L1 layer 30 are to be reproduced.

Figure 2:
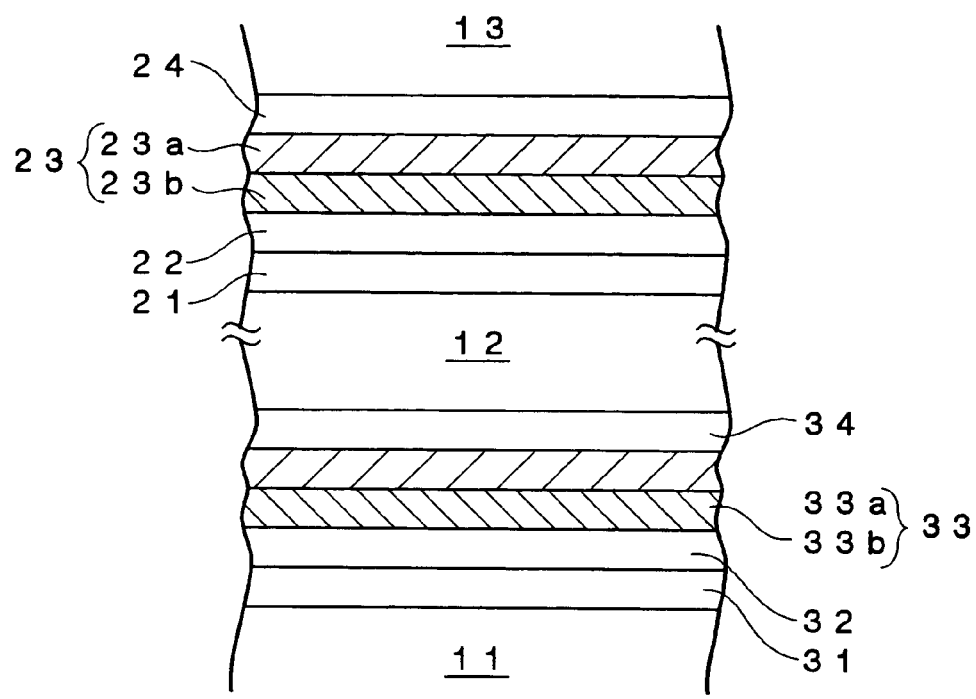
FIG. 2 is a schematic enlarged cross-sectional view of the optical recording medium shown in FIG. 1.

FIG. 2 is a schematic enlarged cross-sectional view of the optical recording medium shown in FIG. 1.

As shown in FIG. 2, the L0 recording layer 23 included in the L0 layer 20 includes a first L0 recording film 23a containing Si as a primary component and a second L0 recording film 23b containing Cu as a primary component.

In order to lower the noise level of a reproduced signal and improve the storage reliability of the optical recording medium 10, it is preferable to add one or more elements selected from the group consisting of Al, Zn, Sn, Mg and Au to the second L0 recording film 23b.

Similarly, as shown in FIG. 2, the L1 recording layer 33 included in the L1 layer 30 includes a first L1 recording film 33a containing Si as a primary component and a second L1 recording film 33b containing Cu as a primary component.

In order to lower the noise level of a reproduced signal and improve the storage reliability of the optical recording medium 10, it is preferable to add one or more elements selected from the group consisting of Al, Zn, Sn, Mg and Au to the second L1 recording film 33b.

Figure 3:
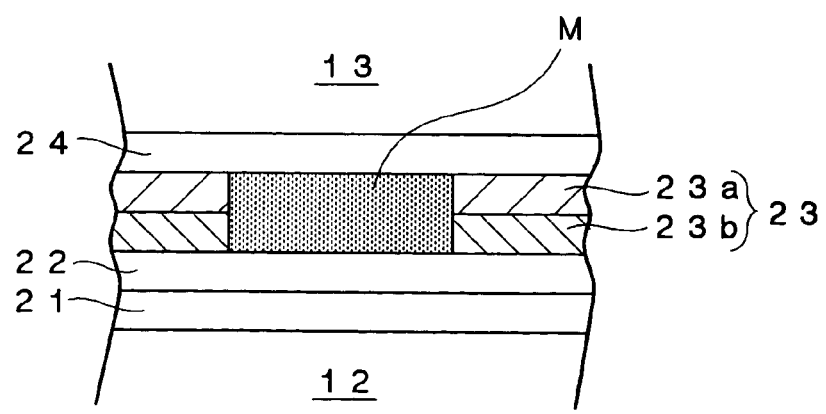
FIG. 3 is a schematic enlarged cross-sectional view showing the optical recording medium shown in FIG. 1 after an L0 recording layer was irradiated with a laser beam.

FIG. 3 is a schematic enlarged cross-sectional view showing the optical recording medium 10 shown in FIG. 1 after the L0 recording layer 23 was irradiated with a laser beam L.

As shown in FIG. 3, when the L0 recording layer 23 of the optical recording medium 10 is irradiated with a laser beam L via a light incident plane 13a, Cu contained in the second recording film 23b as a primary component and Si contained in the first recording film 23a as a primary component are quickly fused or diffused and a region M where Cu and Si are mixed is formed, thereby forming a record mark M.

As shown in FIG. 3, when Si contained in the first L0 recording film 23a as a primary component and Cu contained in the second L0 recording film 23b as a primary component are mixed to form a record mark M, the reflection coefficient of a region where the record mark has been formed greatly changes. Therefore, since the reflection coefficient of the region where the record mark is formed is greatly different from that of the region surrounding the region where the record mark M is formed, it is possible to obtain a high reproduced signal (C/N ratio) by reproducing data recorded in the L0 recording layer 23.

Similarly, when Si contained in the first L1 recording film 33a as a primary component and Cu contained in the second L1 recording film 33b as a primary component are mixed to form a record mark M, the reflection coefficient of a region where the record mark has been formed greatly changes. Therefore, since the reflection coefficient of the region where the record mark is formed is greatly different from that of the region surrounding the region where the record mark M is formed, it is possible to obtain a high reproduced signal (C/N ratio) by reproducing data recorded in the L1 recording layer 33.

Since the laser beam L passes through the L0 recording layer 23 when data are recorded in the L1 recording layer 33 included in the L1 layer 30 and when data are reproduced from the L1 recording layer 33 included in the L1 layer 30, if the difference in light transmittances between a region of the L0 recording layer 23 where a record mark M is formed and a blank region of the L0 recording layer 23 where no record mark M is formed is great, when data are recorded in the L1 recording layer 33 included in the L1 layer 30, the amount of the laser beam L projected onto the L1 recording layer 33 greatly changes depending upon whether the region of the L0 recording layer 23 through which the laser beam L passes is a region where a record mark is formed or a blank region and when data are reproduced from the L1 recording layer 33 included in the L1 layer 30, the amount of the laser beam L reflected from the L1 recording layer 33, transmitting through the L0 layer 20 and detected greatly change depending upon whether the region of the L0 recording layer 23 through which the laser beam L passes is a region where a record mark is formed or a blank region. As a result, the recording characteristics of the L1 recording layer 33 and the amplitude of a signal reproduced from the L1 recording layer 33 change greatly depending upon whether the region of the L0 recording layer 23 through which the laser beam L passes is a region where a record mark M is formed or a blank region.

In particular, when data recorded in the L1 recording layer 33 are reproduced, if the region of the L0 recording layer 23 through which the laser beam L passes contains a boundary between a region where a record mark M is formed and a blank region, since the distribution of the reflection coefficient is not uniform at the spot of the laser beam L, data recorded in the L1 recording layer 33 cannot be reproduced in a desired manner.

In a study done by the inventors of the present invention, it was found that in order to record data in the L1 recording layer 33 and reproduce data from the L1 recording layer 33, it is necessary for the difference in light transmittances between a region of the L0 recording layer 23 where a record mark M is formed and a blank region of the L0 recording layer 23 to be equal to or lower than 4% and it is preferable for the difference to be equal to or lower than 2%.

The inventors of the present invention further found that the difference in light transmittances for a laser beam having a wavelength of 350 nm to 450 nm between the region of a record mark M formed by mixing Si and Cu and a blank region of the L0 recording layer 23 formed by laminating the first recording film 23a containing Si as a primary component and the second recording film 23b containing Cu as primary component is equal to or lower than 4% and the difference in light transmittances for a laser beam having a wavelength of about 405 nm between a region of the L0 recording layer 23 where a record mark M is formed and a blank region of the L0 recording layer 23 is equal to or lower than 1%.

In this embodiment the first L0 recording film 23a of the L0 recording layer 23 contains Si as primary component and the second L0 recording film 23b of the L0 recording layer 23 contains Cu as primary component so that when laser beam L is projected thereonto via the light incident plane 13a, Si contained in the first L0 recording film 23a as a primary component and Cu contained in the second L0 recording film 23b as a primary component are mixed with each other, thereby forming a record mark M. It is therefore possible to record data in the L1 recording layer 33 and reproduce data from the L1 recording layer 33 in a desired manner by projecting a laser beam L onto the L1 recording layer 33 via the L0 layer 20.

Since the laser beam L passes through the L0 recording layer 23 when data are to be recorded in the L1 recording layer 33 included in the L1 layer 30 and data recorded in the L1 recording layer 33 of the L1 layer 30 are to be reproduced, it is necessary for the L0 recording layer 23 to have a high light transmittance and it is therefore preferable to form the L0 recording layer 23 so as to be thinner than the L1 recording layer 33.

Concretely, it is preferable to form the L1 recording layer 33 so as to have a thickness of 2 nm to 40 nm and form the L0 recording layer 23 so as to have a thickness of 2 nm to 15 nm.

In the case where the thickness of the L0 recording layer 23 and the L1 recording layer 33 is thinner than 2 nm, the change in reflection coefficient between before and after irradiation with the laser beam L is small so that a reproduced signal having high strength (C/N ratio) cannot be obtained.

On the other hand, when the thickness of the L0 recording layer 23 exceeds 15 nm, the light transmittance of the L0 layer 20 is lowered and the recording characteristic and the reproducing characteristic of the L1 recording layer 33 are degraded.

Further, when the thickness of the L1 recording layer 33 exceeds 40 nm, the recording sensitivity of the L1 recording layer 33 is degraded.

Furthermore, in order to increase the change in reflection coefficient between before and after irradiation with the laser beam L, it is preferable to define the ratio of the thickness of the first L0 recording film 23a included in the L0 recording layer 23 to the thickness of the second L0 recording film 23b (thickness of the first L0 recording film 23a/thickness of the second L0 recording film 23b) and the ratio of the thickness of the first L1 recording film 33a included in the L1 recording layer 33 to the thickness of the second L1 recording film 33b (thickness of the first L1 recording film 33a/thickness of the second L1 recording film 33b) to be from 0.2 to 5.0.

The first dielectric film 24 and the second dielectric film 22 serve as protective layers for protecting the L0 recording layer 23 and the third dielectric film 34 and the fourth dielectric film 32 serve as protective layers for protecting the L1 recording layer 33.

The thickness of each of the first dielectric film 24, the second dielectric film 22, the third dielectric film 34 and the fourth dielectric film 32 is not particularly limited and it preferably has a thickness of 10 nm to 200 nm. In the case where the thickness of each of the first dielectric film 24, the second dielectric film 22, the third dielectric film 34 and the fourth dielectric film 32 is thinner than 10 nm, each of the first dielectric film 24, the second dielectric film 22, the third dielectric film 34 and the fourth dielectric film 32 does not sufficiently serve as a protective layer. On the other hand, in the case where the thickness of each of the first dielectric film 24, the second dielectric film 22, the third dielectric film 34 and the fourth dielectric film 32 exceeds 200 nm, a long time is required for forming it, thereby lowering the productivity of the optical recording medium 10 and there is some risk of cracking the L0 recording layer 23 and the L1 recording layer 33 due to internal stress.

The first dielectric film 24, the second dielectric film 22, the third dielectric film 34 and the fourth dielectric film 32 may have a single-layered structure or may have a multi-layered structure including a plurality of dielectric films. For example, if the first dielectric film 24 is constituted by two dielectric films formed of materials having different refractive indexes, light interference effect can be increased.

The material for forming the first dielectric film 24, the second dielectric film 22, the third dielectric film 34 and the fourth dielectric film 32 is not particularly limited but it is preferable to form the first dielectric film 24, the second dielectric film 22, the third dielectric film 34 and the fourth dielectric film 32 of oxide, sulfide, nitride of Al, Si, Ce, Zn, Ta, Ti and the like such as $Al_2O_3$, AlN, $SiO_2$, $Si_3N_4$, $CeO_2$, ZnS, TaO and the like or a combination thereof and it is more preferable for them to contain $ZnS.SiO_2$ as a primary component. $ZnS.SiO_2$ means a mixture of ZnS and $SiO_2$.

The reflective film 21 included in the L0 layer 20 serves to reflect the laser beam L entering the light incident plane 13a so as to emit it from the light incident plane 13a and effectively radiate heat generated in the L0 recording layer 23 by the irradiation with the laser beam L.

When data are to be recorded in the L1 recording layer 33 of the L1 layer 30 and data recorded in the L1 recording layer 33 of the L1 layer 30 are to be reproduced, the laser beam L entering the light incident plane 13a impinges onto the L1 recording layer of the L1 layer 30 via the reflective film 21 included in the L0 layer 20. It is therefore necessary to form the reflective film 21 of a material having a high light transmittance and a high thermal conductivity. Further, it is necessary to form the reflective film 21 of a material having long-term storage reliability.

Therefore, in this embodiment, the reflective film 21 included in the L0 layer 20 is formed of a material containing Ag as a primary component and C as an additive.

In the case where the reflective film 21 included in the L0 layer 20 is formed of a material containing Ag as a primary component and C as an additive, it is possible to markedly improve the long-term storage reliability of the reflective film 21 without degrading the inherent high light transmittance and high thermal conductivity of the Ag. Further, material cost is not increased by adding C to the reflective film 21.

Therefore, if the reflective film 21 included in the L0 layer 20 is formed of a material containing Ag as a primary component and C as an additive, a reflective film having a high light transmittance and a high thermal conductivity can be formed and the storage reliability of the optical recording medium 10 can be improved.

In a study carried out by the inventors of the present invention, it was found that the light transmittance and the thermal conductivity of the reflective film 21 included in the L0 layer 20 tended to decrease as the amount of C added to the reflective film 21 increased and it was further found that when the amount of C added to the reflective film 21 was equal to or less than a predetermined value, the storage reliability of the optical recording medium 10 was improved as the amount of C added to the reflective film 21 increased and when the amount of C added to the reflective film 21 exceeded the predetermined value, improvement in the storage reliability of the optical recording medium 10 was not remarkable even if the amount of C added to the reflective film 21 was increased.

More specifically, when the amount of C added to the reflective film 21 exceeds 5.0 atomic %, it is difficult to form the reflective film 21 to have sufficiently high light transmittance and thermal conductivity and, on the other hand, when the amount of C added to the reflective film 21 is less than 0.2 atomic %, the storage reliability of the optical recording medium 10 becomes low. Therefore, it is preferable that the reflective film 21 contains 0.5 atomic % to 5.0 atomic % of C.

Further, when the amount of C added to the reflective film 21 is equal to or less than 4.0 atomic %, it is possible to form the reflective film 21 to have a light transmittance close to that of a reflective film 21 formed of pure Ag and, on the other hand, when the amount of C added to the reflective film 21 exceeds 2.0 atomic %, improvement in the storage reliability of the optical recording medium 10 is small even if the amount of C is increased. Furthermore, when the reflective film 21 contains about 2.5 atomic % of C, it is possible to form the reflective film 21 having substantially the same light transmittance as that of a reflective film 21 formed of pure Ag and obtain an optical recording medium 10 having high storage reliability. Therefore, it is more preferable that the reflective film 21 contains 1.0 atomic % to 4.0 atomic % of C and it is particularly preferable that the reflective film 21 contains about 2.5 atomic % of C.

Since the light transmittance and thermal conductivity of the reflective film 21 included in the L0 layer 20 varies depending upon the amount of C added to the reflective film 21, the thickness of the reflective film 21 is determined based on the amount of C added to the reflective film 21 but, normally, the thickness of the reflective film 21 is preferably thinner than 20 nm and more preferably 5 nm to 15 nm.

The reflective film 31 included in the L1 layer 30 serves to reflect the laser beam L entering through the light incident plane 13a so as to emit it from the light incident plane 13a and effectively radiate heat generated in the L1 recording film 33 by the irradiation with the laser beam L.

The reflective film 31 included in the L1 layer 30 is preferably formed so as to have a thickness of 20 nm to 200 nm. When the reflective film 31 included in the L1 layer 30 is thinner than 20 nm, it does not readily radiate heat generated in the L1 recording layer 33. On the other hand, when the reflective film 31 is thicker than 200 nm, the productivity of the optical recording medium 10 is lowered since a long time is required for forming the reflective film 31 and there is a risk of cracking the reflective film 31 due to internal stress or the like.

The material for forming the reflective film 31 included in the L1 layer 30 is not particularly limited. The reflective film 31 may be formed of the same material as that used for forming the reflective film 21 but unlike the case of forming the reflective film 21 included in the L0 layer 20, it is unnecessary to consider the light transmittance of the material when a material is selected for forming the reflective film 31 included in the L1 layer 30.

The optical recording medium 10 having the above-described configuration can, for example, be fabricated in the following manner.

FIGS. 4 to 7 show the steps of a method for fabricating the optical recording medium 10 according to this embodiment.

Figure 4:
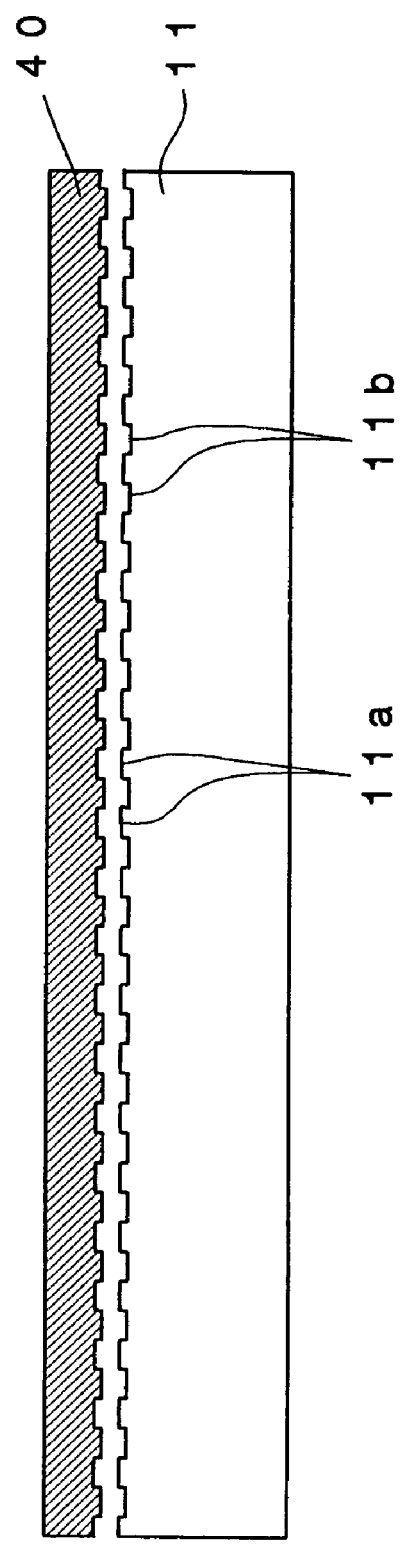
FIG. 4 is a drawing showing a step of a method for fabricating an optical recording medium which is a preferred embodiment of the present invention.

As shown in FIG. 4, the support substrate 11 having grooves 11a and lands 11b on the surface thereof is first fabricated by an injection molding process using a stamper 40.

Figure 5:
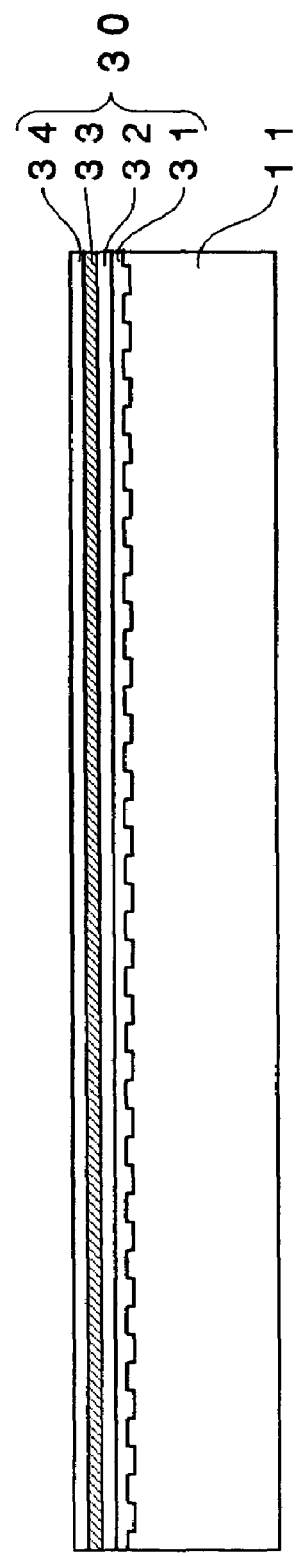
FIG. 5 is a drawing showing a step of a method for fabricating an optical recording medium which is a preferred embodiment of the present invention.

Then, as shown in FIG. 5, the reflective film 31, the fourth dielectric film 32, the L1 recording layer 33 including the second L1 recording film 33b and the first L1 recording film 33a and the third dielectric film 34 are sequentially formed on the substantially entire surface of the support substrate 11 on which the grooves 11a and the lands 11b are formed by a gas phase growth process such as a sputtering process, thereby forming the L1 layer 30.

Figure 6:
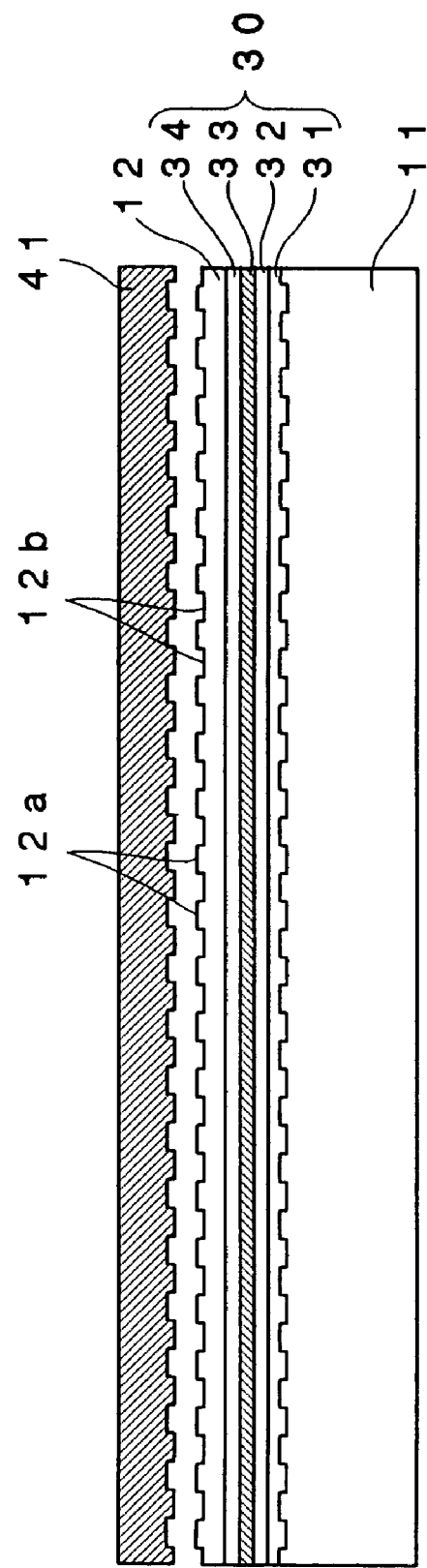
FIG. 6 is a drawing showing a step of a method for fabricating an optical recording medium which is a preferred embodiment of the present invention.

Further, as shown in FIG. 6, an ultraviolet ray curable resin is coated on the L1 layer 30 by a spin coating method to form a coating film and the surface of the coating film is irradiated with an ultraviolet ray via a stamper 41 while it is covered by the stamper 41, thereby forming the transparent intermediate layer 12 formed with grooves 12a and lands 12b on the surface thereof.

Figure 7:
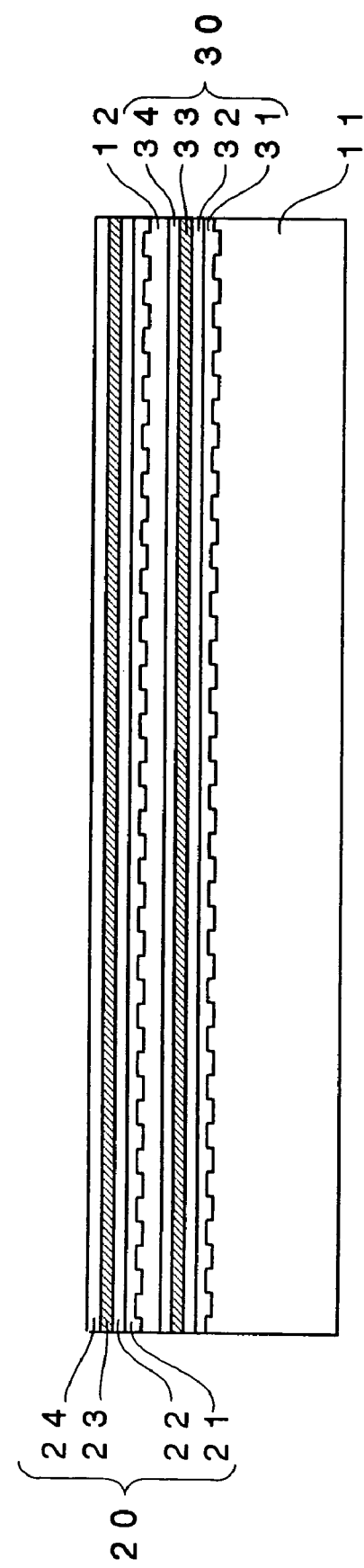
FIG. 7 is a drawing showing a step of a method for fabricating an optical recording medium which is a preferred embodiment of the present invention.

Then, as shown in FIG. 7, the reflective film 21, the second dielectric film 22, the L0 recording layer 23 including the second L0 recording film 23b and the first L0 recording film 23a and the first dielectric film 24 are sequentially formed on substantially the entire surface of the transparent intermediate layer 12 on which the grooves 12a and the lands 12b are formed, by a gas phase growth process such as a sputtering process, thereby forming the L0 layer 20.

An ultraviolet ray curable resin is further coated on the L0 layer 20 by a spin coating method to form a coating film and the surface of the coating film is irradiated with an ultraviolet ray, thereby forming the light transmission layer 13.

This completes the fabrication of the optical recording medium 10.

When data are to be recorded in the thus constituted optical recording medium 10, the light incident plane 13a of the light transmission layer 13 is irradiated with a laser beam L whose intensity is modulated and the focus of the laser beam L is adjusted onto the L0 recording layer 23 included in the L0 layer 20 or the L1 recording layer 33 included in the L1 layer 30.

A laser beam L having a wavelength of 350 nm to 450 nm is preferably employed for recording data in the optical recording medium 10 and reproducing data from the optical recording medium 10 and in this embodiment, a laser beam L having a wavelength of 405 nm is condensed by an objective lens having a numerical aperture of 0.85 onto the L0 recording layer 23 or the L1 recording layer 33 via the light transmission layer 13.

As a result, Si contained in the first L0 recording film 23a of the L0 recording layer 23 as a primary component and Cu contained in the second L0 recording film 23b as a primary component are mixed with each other at a region irradiated with the laser beam L and as shown in FIG. 3, a record mark M is formed or Si contained in the first L1 recording film 33a of the L1 recording layer 33 as a primary component and Cu contained in the second L1 recording film 33b as a primary component are mixed with each other at a region irradiated with the laser beam L and as shown in FIG. 3, a record mark M is formed.

In this manner, record marks M are formed in the L0 recording layer 23 of the L0 layer 20 or the L1 recording layer 33 of the L1 layer 30 and data are recorded therein.

In this embodiment, the difference in light transmittances for a laser beam having a wavelength of 350 nm to 450 nm between the region of a record mark M formed by mixing Si and Cu and a blank region of the L0 recording layer 23 formed by laminating the first recording film 23a containing Si as a primary component and the second recording film 23b containing Cu as primary component is equal to or lower than 4% and the difference in light transmittances for a laser beam having a wavelength of about 405 nm between the region of the L0 recording layer 23 where a record mark M is formed and a blank region of the L0 recording layer 23 is equal to or lower than 1%. Therefore, even when a laser beam L is projected onto the L1 recording layer 33 via the L0 layer 20 to record data in the L1 recording layer 33, it is possible to record data in the L1 recording layer 33 in a desired manner.

On the other hand, when data recorded in the optical recording medium 10 are to be reproduced, the light incident plane 13a of the light transmission layer 13 is irradiated with a laser beam L whose intensity is modulated and the focus of the laser beam L is adjusted onto the L0 recording layer 23 included in the L0 layer 20 or the L1 recording layer 33 included in the L1 layer 30.

Since the reflection coefficient of the region of a record mark M formed by mixing Si contained in the first L0 recording film 23a of the L0 recording layer 23 as a primary component and Cu contained in the second L0 recording film 23b as a primary component or the reflection coefficient of a region of a record mark M formed by mixing Si contained in the first L1 recording film 33a of the L1 recording layer 33 as a primary component and Cu contained in the second L1 recording film 33b as a primary component is greatly different from that of a region surrounding the region where the record mark M is formed, it is possible to obtain a high reproduced signal (C/N ratio) by detecting the amount of the laser beam L reflected by the L0 recording layer 23 or the L1 recording layer 33.

According to this embodiment, when the L0 recording layer 23 of the optical recording medium 10 is irradiated with the laser beam L via the light incident plane 13a, Cu contained in the second L0 recording film 23b as a primary component and Si contained in the first L0 recording film 23a as a primary component are quickly fused or diffused and a region where Cu and Si are mixed is formed, thereby forming a record mark M. On the other hand, when the L1 recording layer 33 of the optical recording medium 10 is irradiated with a laser beam L via the light incident plane 13a, Cu contained in the second L1 recording film 33b as a primary component and Si contained in the first L1 recording film 33a as a primary component are quickly fused or diffused and a region where Cu and Si are mixed is formed, thereby forming a record mark M. Since the reflection coefficient of the region where the record mark M is formed in this manner is greatly different from that of the region of the L0 recording layer 23 or the L1 recording layer 33, it is possible to obtain a high reproduced signal (C/N ratio) by reproducing data recorded in the L0 recording layer 23 or the L1 recording layer 33.

Further, according to this embodiment, since the difference in light transmittances for a laser beam having a wavelength of 350 nm to 450 nm between a region of a record mark M formed by mixing Si and Cu and a blank region of the L0 recording layer 23 formed by laminating the first recording film 23a containing Si as a primary component and the second recording film 23b containing Cu as primary component is equal to or lower than 4% and the difference in light transmittances for a laser beam having a wavelength of about 405 nm between a region of the L0 recording layer 23 where a record mark M is formed and a blank region of the L0 recording layer 23 is equal to or lower than 1%, it is possible to record data in the L1 recording layer 33 and reproduce data recorded in the L1 recording layer by projecting the laser beam L onto the L1 recording layer 33 via the L0 layer 20.

Furthermore, according to this embodiment, since the reflective film 21 included in the L0 layer 20 is formed of a material containing Ag as a primary component and C as an additive, it is possible to improve a light transmittance and a thermal conductivity of the reflective film 21 included in the L0 layer 20 while preventing the reflective film 21 from being corroded and it is therefore possible to improve the recording characteristics and reproducing characteristics of the L0 layer 20 and the L1 layer 30 and improve the storage reliability of the optical recording medium 10.

WORKING EXAMPLES

Hereinafter, working examples will be set out in order to further clarify the advantages of the present invention.

Working Example 1

An optical recording medium sample #1 was fabricated in the following manner.

A disk-like polycarbonate substrate having a thickness of 1.1 mm and a diameter of 120 mm and formed with grooves and lands on the surface thereof was first fabricated by an injection molding process so that the track pitch (groove pitch) was equal to 0.32 μm.

Then, the polycarbonate substrate was set on a sputtering apparatus and a reflective film consisting of an alloy of Ag, Pd and Cu and having a thickness of 100 nm, a fourth dielectric film containing a mixture of ZnS and $SiO_2$ and having a thickness of 40 nm, a second L1 recording film containing Cu as a primary component and having a thickness of 3 nm, a first L1 recording film containing Si as a primary component and having a thickness of 3 nm and a third dielectric film containing the mixture of ZnS and $SiO_2$ and having a thickness of 22 nm were sequentially formed on the surface of the polycarbonate substrate on which the grooves and lands were formed, using the sputtering process, thereby forming an L1 layer on the surface of the polycarbonate substrate.

The mole ratio of ZnS to $SiO_2$ in the mixture of ZnS and $SiO_2$ contained in the third dielectric layer and the fourth dielectric layer was 80:20.

Further, the polycarbonate substrate formed with the L1 layer on the surface thereof was set on a spin coating apparatus and the third dielectric film was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A transparent intermediate layer having a thickness of 20 μm and formed with grooves and lands on the surface thereof so that the track pitch (groove pitch) was equal to 0.32 μm was formed by removing the stamper.

Then, the polycarbonate substrate formed with the L1 layer and the transparent intermediate layer on the surface thereof was set on the sputtering apparatus and a reflective film consisting of an alloy of Ag, Pd and Cu and having a thickness of 8 nm, a second dielectric film containing a mixture of ZnS and $SiO_2$ and having a thickness of 28 nm, a second L0 recording film containing Cu as a primary component and having a thickness of 3 nm, a first L0 recording film containing Si as a primary component and having a thickness of 3 nm and a first dielectric film containing the mixture of ZnS and $SiO_2$ and having a thickness of 22 nm were sequentially formed on the surface of the transparent intermediate layer formed on the L1 layer using the sputtering process, thereby forming an L0 layer on the surface of the transparent intermediate layer.

The mole ratio of ZnS to $SiO_2$ in the mixture of ZnS and $SiO_2$ contained in the first dielectric layer and the second dielectric layer was 80:20.

Further, the first dielectric film was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 80 μm. Thus, the optical recording medium sample #1 was fabricated.

An optical recording medium sample #2 was fabricated in the manner of the optical recording medium sample #1, except that a second L0 recording film containing Cu as a primary component, added with 23 atomic % of Al and 13 atomic % of Au and having a thickness of 5 nm and a second L1 recording film containing Cu as a primary component, added with 23 atomic % of Al and 13 atomic % of Au and having a thickness of 5 nm were formed.

Further, an optical recording medium sample #3 was fabricated in the following manner.

A disk-like polycarbonate substrate having a thickness of 1.1 mm and a diameter of 120 mm and formed with grooves and lands on the surface thereof was first fabricated by an injection molding process so that the track pitch (groove pitch) was equal to 0.32 µm.

Then, the polycarbonate substrate was set on a sputtering apparatus and a reflective film consisting of an alloy of Ag, Pd and Cu and having a thickness of 100 nm, a fourth dielectric film containing a mixture of ZnS and $SiO_2$ and having a thickness of 38 nm, a second L1 recording film containing Cu as a primary component, added with 21 atomic % of Mg and having a thickness of 5 nm, a first L1 recording film containing Si as a primary component and having a thickness of 5 nm and a third dielectric film containing ZnS and having a thickness of 21 nm were sequentially formed on the surface of the polycarbonate substrate on which the grooves and lands were formed, using the sputtering process, thereby forming an L1 layer on the surface of the polycarbonate substrate.

The mole ratio of ZnS to $SiO_2$ in the mixture of ZnS and $SiO_2$ contained in the fourth dielectric layer was 80:20.

Further, the polycarbonate substrate formed with the L1 layer on the surface thereof was set on a spin coating apparatus and the third dielectric film was coated with a resin solution prepared by dissolving acrylic ultraviolet curable resin in a solvent to form a coating layer while the polycarbonate substrate was being rotated. Then, a stamper formed with grooves and lands was placed on the surface of the coating layer and the surface of the coating layer was irradiated with an ultraviolet ray via the stamper, thereby curing the acrylic ultraviolet curable resin. A transparent intermediate layer having a thickness of 20 µm and formed with grooves and lands on the surface thereof so that the track pitch (groove pitch) was equal to 0.32 µm was formed by removing the stamper.

Then, the polycarbonate substrate formed with the L1 layer and the transparent intermediate layer on the surface thereof was set on the sputtering apparatus and a reflective film consisting of an alloy of Ag, Pd and Cu and having a thickness of 8 nm, a second dielectric film containing a mixture of ZnS and $SiO_2$ and having a thickness of 32 nm, a second L0 recording film containing Cu as a primary component, added with 21 atomic % of Mg and having a thickness of 5 nm, a first L0 recording film containing Si as a primary component and having a thickness of 5 nm and a first dielectric film containing ZnS and having a thickness of 32 nm were sequentially formed on the surface of the transparent intermediate layer formed on the L1 layer using the sputtering process, thereby forming an L0 layer on the surface of the transparent intermediate layer.

The mole ratio of ZnS to $SiO_2$ in the mixture of ZnS and $SiO_2$ contained in the second dielectric layer was 80:20.

Further, the first dielectric film was coated using the spin coating method with a resin solution prepared by dissolving acrylic ultraviolet curing resin in a solvent to form a coating layer and the coating layer was irradiated with ultraviolet rays, thereby curing the acrylic ultraviolet curing resin to form a protective layer having a thickness of 80 µm. Thus, the optical recording medium sample #3 was fabricated.

The L1 layer of each of the thus fabricated optical recording medium samples #1 to #3 was irradiated with a laser beam having a wavelength of 405 nm via the unrecorded L0 layer and the amount of the laser beam reflected by the L1 layer was detected to measure the reflection coefficient R1 of the L1 layer of each of the optical recording medium samples #1 to #3.

The laser beam was projected onto each of the optical recording medium samples #1 to #3 using an objective lens having a numerical aperture of 0.85.

Then, a random signal including 2T to 8T was recorded in the L0 layer of each of the optical recording medium samples #1 to #3 in accordance with the (1, 7) modulation mode to form record marks in the first L0 recording film and the second L0 recording film thereof.

A laser beam having a wavelength of 405 nm was condensed using an objective lens having a numerical aperture of 0.85 onto the L1 layer of each of the optical recording medium samples #1 to #3 via the L0 layer in which the random signal had been recorded and the amount of the laser beam reflected by the L1 layer was detected to measure the reflection coefficient R2 of the L1 layer of each of the optical recording medium samples #1 to #3. When the laser beam was projected onto the L1 layer of each of the optical recording medium samples #1 to #3, the record marks were uniformly distributed in the L0 layer within the spot of the laser beam.

Based on the thus measured reflection coefficients R1 and R2 of the L1 layer of each of the optical recording medium samples #1 to #3, the difference in reflection coefficients ΔR=R1−R2 was calculated for the L1 layer of each of the optical recording medium samples #1 to #3.

The reflection coefficients R1 and R2 and the difference in reflection coefficients ΔR of the L1 layer of each of the optical recording medium samples #1 to #3 are shown in Table 1.

TABLE 1

| Optical Recording Medium Sample | #1 | #2 | #3 |
| --- | --- | --- | --- |
| R1 | 5.7% | 6.7% | 6.2% |
| R2 | 6.0% | 6.4% | 6.0% |
| ΔR | 0.3% | 0.3% | 0.2% |

As shown in Table 1, it was found that the difference ΔR between the reflection coefficient R1 of the L1 layer before the record marks were formed and the reflection coefficient R2 of the L1 layer after the record marks were formed was equal to or less than 0.3% in each of the optical recording medium samples #1 to #3 and that the difference between the light transmittance of a region of the L0 layer where a record mark was formed and the light transmittance of a blank region of the L0 layer was very small.

Working Example 2

An optical recording medium sample #4 was fabricated in the following manner.

A disk-like polycarbonate substrate having a thickness of 1.1 mm and a diameter of 120 mm and formed with grooves and lands on the surface thereof was first fabricated by an injection molding process so that the track pitch (groove pitch) was equal to 0.32 µm.

Then, the polycarbonate substrate was set on a sputtering apparatus and a reflective film consisting of an alloy of Ag, Pd and Cu and having a thickness of 8 nm, a second dielectric film containing a mixture of ZnS and $SiO_2$ and having a thickness of 28 nm, a second recording film containing Cu as a primary component and having a thickness of 5 nm, a first recording film containing Si as a primary component and having a thickness of 5 nm and a first dielectric film containing the mixture of ZnS and $SiO_2$ and having a thickness of 22 nm were sequentially formed on the surface of the polycarbonate substrate on which the grooves and lands were formed using the sputtering process.

The mole ratio of ZnS to $SiO_2$ in the mixture of ZnS and $SiO_2$ contained in the first dielectric layer and the second dielectric layer was 80:20.

Further, the polycarbonate substrate formed with the reflective film, the second dielectric film, the second recording film, the first recording film and the first dielectric film was set on a spin coating apparatus and the first dielectric film was coated using the spin coating method with a resin solution prepared by dissolving acrylic ultraviolet curing resin in a solvent to form a coating layer. The coating layer was then irradiated with ultraviolet rays, thereby curing the acrylic ultraviolet curing resin to form a protective layer having a thickness of 100 μm. Thus, the optical recording medium sample #4 was fabricated.

A laser beam having a wavelength λ was projected onto the optical recording medium sample #4 via the light transmission layer and the amount of the laser beam transmitted through the optical recording medium sample #4 was measured.

The wavelength λ of the laser beam was varied within a range of 350 nm to 800 nm and the amount of the laser beam transmitted through the optical recording medium sample #4 was measured for each wavelength of the laser beam, thereby measuring light transmittance T1 of the optical recording medium sample #4 for each wavelength of the laser beam.

Further, a laser beam having a high power was projected onto a predetermined region of the first recording film of the second recording film of the optical recording medium sample #4 via the light transmission layer, thereby mixing Si contained in the first recording film as a primary component and Cu contained in the second recording film as a primary component to form a record mark.

Then, a laser beam having a wavelength λ was projected onto the region of the first recording film and the second recording film where the record mark was formed in this manner and the amount of the laser beam transmitted through the optical recording medium sample #4 was measured.

The wavelength λ of the laser beam was varied within a range of 350 nm to 800 nm and the amount of the laser beam transmitted through the optical recording medium sample #4 was measured for each wavelength of the laser beam, thereby measuring light transmittance T2 of the optical recording medium sample #4 for each wavelength of the laser beam.

Based on the thus measured light transmittances T1 and T2 of the optical recording medium sample #4 for each wavelength of the laser beam, the difference ΔT=T1-T2 in light transmittances between before and after forming the record mark was calculated for each wavelength of the laser beam.

Figure 8:
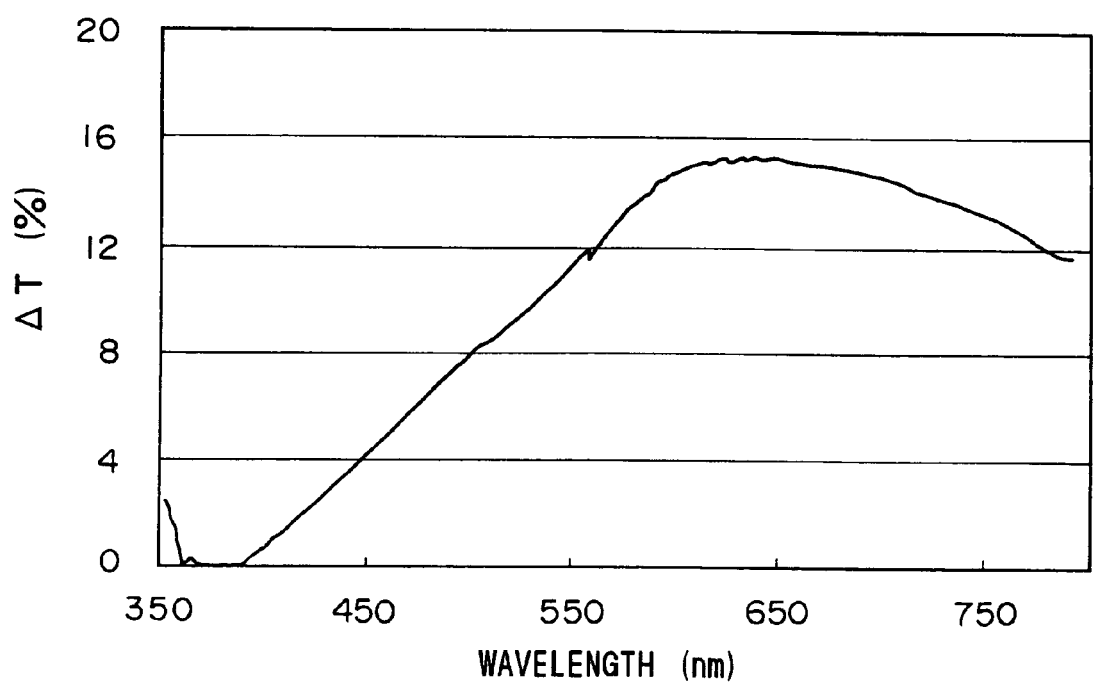
FIG. 8 is a graph showing how difference $\Delta T$ in light transmittances of an optical recording medium sample #4 in Working Example 2 varied with a wavelength of a laser beam.

The results of the calculation are shown in FIG. 8.

As shown in FIG. 8, when the wavelength λ of the laser beam was within a range of 350 nm to 450 nm, the light transmittance difference ΔT of the optical recording medium sample #4 was equal to or less than 4% and when the wavelength λ of the laser beam was within a range of 350 nm to 420 nm, the light transmittance difference ΔT of the optical recording medium sample #4 was equal to or less than 2%.

In particular, it was found that when the wavelength λ of the laser beam was within a range of 350 nm to 410 nm, the light transmittance difference ΔT of the optical recording medium sample #4 was equal to or less than 1% and there was few difference in light transmittances between the region where the record mark was formed and the blank region where no record mark was formed.

The present invention has thus been shown and described with reference to specific embodiments and working examples. However, it should be noted that the present invention is in no way limited to the details of the described arrangements but changes and modifications may be made without departing from the scope of the appended claims.

For example, in the above described embodiment, although the first L0 recording film 23*a* and the second L0 recording film 23*b* of the L0 layer 20 are formed in contact with each other it is not absolutely necessary to form the first L0 recording film 23*a* and the second L0 recording film 23*b* of the L0 layer 20 in contact with each other but it is sufficient for the second L0 recording film 23*b* to be so located in the vicinity of the first L0 recording film 23*a* as to enable formation of a mixed region including the primary component element of the first L0 recording film 23*a* and the primary component element of the second L0 recording film 23*b* when the region is irradiated with a laser beam. Further, one or more other films such as a dielectric film may be interposed between the first L0 recording film 23*a* and the second L0 recording film 23*b*.

Further, in the above described embodiment, although the first L1 recording film 33*a* and the second L1 recording film 33*b* of the L1 layer 30 are formed in contact with each other it is not absolutely necessary to form the first L1 recording film 33*a* and the second L1 recording film 33*b* of the L1 layer 30 in contact with each other but it is sufficient for the second L1 recording film 33*b* to be so located in the vicinity of the first L1 recording film 33*a* as to enable formation of a mixed region including the primary component element of the first L1 recording film 33*a* and the primary component element of the second L1 recording film 33*b* when the region is irradiated with a laser beam. Further, one or more other films such as a dielectric film may be interposed between the first L1 recording film 33*a* and the second L1 recording film 33*b*.

Furthermore, in the above described embodiment, although the L0 recording layer 23 includes the first L0 recording film 23*a* and the second L0 recording film 23*b*, the L0 recording layer 23 may include one or more recording films containing the same element as a primary component as that contained in the first L0 recording film 23*a* as a primary component or one or more recording films containing the same element as a primary component as that contained in the second L0 recording film 23*b* as a primary component, in addition to the first L0 recording film 23*a* and the second L0 recording film 23*b*.

Moreover, in the above described embodiment, although the L1 recording layer 33 includes the first L1 recording film 33*a* and the second L1 recording film 33*b*, the L1 recording layer 33 may include one or more recording films containing the same element as a primary component as that contained in the first L1 recording film 33*a* as a primary component or one or more recording films containing the same element as a primary component as that contained in the second L1 recording film 33*b* as a primary component, in addition to the first L1 recording film 33*a* and the second L1 recording film 33*b*.

Further, in the above described embodiment, although each of the first L0 recording film 23*a* and the first L1 recording film 33a contains Si as a primary component, it is not absolutely necessary for each of the first L0 recording film 23a and the first L1 recording film 33a to contain Si as a primary component and each of the first L0 recording film 23a and the first L1 recording film 33a may contain an element selected from the group consisting of Ge, Sn, Mg, In, Zn, Bi and Al instead of Si.

Moreover, in the above described embodiment, although each of the second L0 recording film 23b and the second L1 recording film 33b contains Cu as a primary component, it is not absolutely necessary for each of the second L0 recording film 23b and the second L1 recording film 33b to contain Cu as a primary component and each of the second L0 recording film 23b and the second L1 recording film 33b may contain an element selected from the group consisting of Al, Zn, Ti and Ag instead of Cu.

Furthermore, in the above described embodiment, although the first L0 recording film 23a is disposed on the side of the light transmission layer 13 and the second L0 recording film 23b is disposed on the side of the support substrate 11, it is possible to dispose the first L0 recording film 23a on the side of the support substrate 11 and the second L0 recording film 23b on the side of the light transmission layer 13.

Moreover, in the above described embodiment, although the first L1 recording film 33a is disposed on the side of the light transmission layer 13 and the second L1 recording film 33b is disposed on the side of the support substrate 11, it is possible to dispose the first L1 recording film 33a on the side of the support substrate 11 and the second L1 recording film 33b on the side of the light transmission layer 13.

Further, in the above described embodiment, similarly to the L0 recording layer 23, the L1 recording layer 33 includes the first L1 recording film 33a containing Si as a primary component and the second L1 recording film 33b containing Cu as a primary component. However, since the laser beam L does not pass through the L1 recording layer 33 when data are recorded in the L0 recording layer 23 or data are reproduced from the L0 recording layer 23, it is not absolutely necessary for the L1 recording layer 33 to include the first L1 recording film 33a containing Si as a primary component and the second L1 recording film 33b containing Cu as a primary component and the L1 recording layer 33 may be constituted as a single recording film or as a recording layer adapted to enable only data reading by forming prepits on the surface of the support substrate 11.

Furthermore, in the above described embodiment, although the reflective film 21 included in the L0 layer 20 contains Ag as a primary component and is added with C, it is not absolutely necessary for the reflective film 21 included in the L0 layer 20 to contain Ag as a primary component and be added with C and the reflective film 21 included in the L0 layer 20 may be formed of a material containing metal having high thermal conductivity such as Ag, Al or the like and added with an element useful for improving corrosion resistance such as Au, Cu, Pt, Pd, Sb, Ti, Mg or the like.

Moreover, in the above described embodiment, although the L0 layer 20 includes the reflective film 21 containing Ag as a primary component and added with C, if the level of reflected light in the region of the record mark formed by the irradiation with the laser beam L and the level of reflected light in blank regions of the L0 recording layer 23 greatly differ from each other, the reflective film 21 may be omitted.

Further, in the above described embodiment, although the reflective film 21 of the L0 layer 20 is formed on the transparent intermediate layer 12, it is possible to provide a protective layer having a thickness of 2 nm to 150 nm and made of a material for forming the first dielectric film 24 between the transparent intermediate layer 12 and the reflective film 21 and physically space the reflective film 21 and the transparent intermediate layer 12, thereby preventing the transparent intermediate layer 12 from being damaged by heat when data are recorded in the L0 recording layer 23.

Furthermore, in the above described embodiment, although the light transmission layer 13 is formed on the surface of the first dielectric film 24 of the L0 layer 20, it is possible to provide a transparent heat radiation film having a thickness of 10 nm to 200 nm and made of a material having higher thermal conductivity than that of the material forming the first dielectric film 24 between the first dielectric film 24 and the light transmission layer 13 in order to improve heat radiation characteristics of the L0 layer 20 and it is further possible to provide a dielectric film having a different refractive index from that of the transparent heat radiation film between the transparent heat radiation film and the light transmission layer 13 in order to increase light interference effect.

According to the present invention, it is possible to provide an optical recording medium which is constituted so that data can be recorded in a plurality of recording layers and data can be reproduced from the plurality of recording layers by projecting a laser beam thereonto via a light transmission layer and in which data can be recorded in a farthest recording layer from the light transmission layer in a desired manner and data can be reproduced from the farthest recording layer in a desired manner, and a method for recording data in and reproducing data from such an optical recording medium in a desired manner.

The invention claimed is:

1. An optical recording medium comprising a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, at least one recording layer other than the farthest recording layer from the light transmission layer among the plurality of recording layers including a first recording film containing an element selected from a group consisting of Si, Ge, Sn, Mg, In, Zn, Bi and Al as a primary component and a second recording film located in the vicinity of the first recording film and containing an element selected from a group consisting of Cu, Al, Zn, Ti and Ag as a primary component.

2. An optical recording medium in accordance with claim 1, wherein the first recording film contains Si as a primary component.

3. An optical recording medium in accordance with claim 2, wherein the second recording film contains Cu as a primary component.

4. An optical recording medium in accordance with claim 3, wherein at least one element selected from the group consisting of Al, Zn, Sn, Mg and Au and different from the element contained in the second recording layer as a primary component is added to the second recording film.

5. An optical recording medium in accordance with claim 4, wherein the second recording film is formed so as to be in contact with the first recording film.

6. An optical recording medium in accordance with claim 5, wherein the light transmission layer has a thickness of 30 μm to 200 μm.

7. An optical recording medium in accordance with claim 6 which is further constituted so that data are recorded therein and data are reproduced therefrom by projecting a laser beam having a wavelength of 350 nm to 450 nm thereonto.

8. An optical recording medium in accordance with claim 6 which is further constituted so that data are recorded therein and data are reproduced therefrom by employing an objective lens and a laser beam whose numerical aperture NA and wavelength λ satisfy λ/NA≦640 nm, and projecting the laser beam thereonto via the objective lens.

9. An optical recording medium in accordance with claim 3, wherein the light transmission layer has a thickness of 30 μm to 200 μm.

10. An optical recording medium in accordance with claim 9 which is further constituted so that data are recorded therein and data are reproduced therefrom by projecting a laser beam having a wavelength of 350 nm to 450 nm thereonto.

11. An optical recording medium in accordance with claim 6 which is further constituted so that data are recorded therein and data are reproduced therefrom by employing an objective lens and a laser beam whose numerical aperture NA and wavelength λ satisfy λ/NA≦640 nm, and projecting the laser beam thereonto via the objective lens.

12. An optical recording medium in accordance with claim 3 which is further constituted so that data are recorded therein and data are reproduced therefrom by projecting a laser beam having a wavelength of 350 nm to 450 nm thereonto.

13. An optical recording medium in accordance with claim 3 which is further constituted so that data are recorded therein and data are reproduced therefrom by employing an objective lens and a laser beam whose numerical aperture NA and wavelength λ satisfy λ/NA≦640 nm, and projecting the laser beam thereonto via the objective lens.

14. An optical recording medium comprising a substrate, a light transmission layer and a plurality of recording layers between the substrate and the light transmission layer and capable of forming record marks in the plurality of recording layers, thereby recording data therein and reproducing data recorded in the plurality of recording layers by projecting a laser beam via the light transmission layer onto the plurality of recording layers, at least one recording layer other than the farthest recording layer from the light transmission layer among the plurality of recording layers being constituted so that a difference in light transmittances between a region of a record mark formed by the irradiation of the laser beam and blank regions is equal to or lower than 4%.

15. An optical recording medium in accordance with claim 14, wherein the light transmission layer has a thickness of 30 μm to 200 μm.

16. An optical recording medium in accordance with claim 15 which is further constituted so that data are recorded therein and data are reproduced therefrom by projecting a laser beam having a wavelength of 350 nm to 450 nm thereonto.

17. An optical recording medium in accordance with claim 15 which is further constituted so that data are recorded therein and data are reproduced therefrom by employing an objective lens and a laser beam whose numerical aperture NA and wavelength λ satisfy λ/NA≦640 nm, and projecting the laser beam thereonto via the objective lens.

18. An optical recording medium in accordance with claim 14 which is further constituted so that data are recorded therein and data are reproduced therefrom by projecting a laser beam having a wavelength of 350 nm to 450 nm thereonto.

19. An optical recording medium in accordance with claim 14 which is further constituted so that data are recorded therein and data are reproduced therefrom by employing an objective lens and a laser beam whose numerical aperture NA and wavelength λ satisfy λ/NA≦640 nm, and projecting the laser beam thereonto via the objective lens.

20. A method for recording and reproducing data comprising the steps of projecting a laser beam onto an optical recording medium comprising, a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, at least one recording layer other than the farthest recording layer from the light transmission layer among the plurality of recording layers including a first recording film containing an element selected from the group consisting of Si, Ge, Sn, Mg, In, Zn, Bi and Al as a primary component and a second recording film located in the vicinity of the first recording film and containing an element selected from a group consisting of Cu, Al, Zn, Ti and Ag as a primary component, thereby causing the laser beam to pass through the light transmission layer, and recording data in the plurality of recording layers or reproducing data from the plurality of recording layers.

21. A method for recording and reproducing data in accordance with claim 20 wherein the first recording film of the optical recording medium contains Si as a primary component.

22. A method for recording and reproducing data in accordance with claim 21 wherein the second recording film of the optical recording medium contains Cu as a primary component.

23. A method for recording and reproducing data in accordance with claim 22 which comprises a step of irradiating the optical recording medium with a laser beam having a wavelength of 350 nm to 450 nm, thereby recording data in the optical recording medium or reproducing data from the optical recording medium.

24. A method for recording and reproducing data in accordance with claim 22 which comprises a step of employing an objective lens and a laser beam whose numerical aperture NA and wavelength λ satisfy λ/NA≦640 nm, and projecting the laser beam onto the optical recording medium via the objective lens, thereby recording data in the optical recording medium or reproducing data from the optical recording medium.

25. A method for recording and reproducing data in accordance with claim 20 which comprises a step of irradiating the optical recording medium with a laser beam having a wavelength of 350 nm to 450 nm, thereby recording data in the optical recording medium or reproducing data from the optical recording medium.

26. A method for recording and reproducing data in accordance with claim 20 which comprises a step of employing an objective lens and a laser beam whose numerical aperture NA and wavelength λ satisfy λ/NA≦640 nm, and projecting the laser beam onto the optical recording medium via the objective lens, thereby recording data in the optical recording medium or reproducing data from the optical recording medium.

27. An optical recording medium comprising a substrate, a light transmission layer and a plurality of recording layers between the substrate and the light transmission layer and capable of recording data in the plurality of recording layers and reproducing data recorded in the plurality of recording layers by projecting a laser beam via the light transmission layer onto the plurality of recording layers, at least one recording layer other than the farthest recording layer from the light transmission layer among the plurality of recording layers including a first recording film containing Si as a primary component and a second recording film located in the vicinity of the first recording film and containing Cu as a primary component.

* * * * *

UNITED STATES PATENT AND TRADEMARK OFFICE
CERTIFICATE OF CORRECTION

PATENT NO. : 7,276,274 B2
APPLICATION NO. : 10/613525
DATED : October 2, 2007
INVENTOR(S) : Hiroyasu Inoue et al.

It is certified that error appears in the above-identified patent and that said Letters Patent is hereby corrected as shown below:

Claim 6, column 22, line 56, "in accordance with claim 5" should read as --in accordance with claim 3--.

Claim 7, column 22, line 59, "in accordance with claim 6" should read as --in accordance with claim 5--.

Claim 8, column 22, line 64, "in accordance with claim 6" should read as --in accordance with claim 3--.

Claim 9, column 23, line 3, "in accordance with claim 3" should read as --in accordance with claim 6--.

Claim 10, column 23, line 6, "in accordance with claim 9" should read as --in accordance with claim 7--.

Claim 11, column 23, line 11, "in accordance with claim 6" should read as --in accordance with claim 3--.

Claim 12, column 23, line 17, "in accordance with claim 3" should read as --in accordance with claim 6--.

Claim 13, column 23, line 21, "in accordance with claim 3" should read as --in accordance with claim 7--.

Claim 16, column 23, line 42, "in accordance with claim 15" should read as --in accordance with claim 14--.

Claim 19, column 23, line 58, "in accordance with claim 14" should read as --in accordance with claim 15--.

UNITED STATES PATENT AND TRADEMARK OFFICE
CERTIFICATE OF CORRECTION

PATENT NO.       : 7,276,274 B2
APPLICATION NO.  : 10/613525
DATED            : October 2, 2007
INVENTOR(S)      : Hiroyasu Inoue et al.

It is certified that error appears in the above-identified patent and that said Letters Patent is hereby corrected as shown below:

Claim 23, column 24, line 26, "in accordance with claim 22" should read as --in accordance with claim 20--.

Claim 26, column 24, line 45, "in accordance with claim 20" should read as --in accordance with claim 22--.

Signed and Sealed this

Twenty-eighth Day of October, 2008

JON W. DUDAS
*Director of the United States Patent and Trademark Office*